United States Patent
Song et al.

(10) Patent No.: US 9,056,255 B2
(45) Date of Patent: Jun. 16, 2015

(54) GAME CONTROLLER, GAME MACHINE, AND GAME SYSTEM USING THE GAME CONTROLLER

(75) Inventors: Byung-youn Song, Suwon-si (KR); Nag-eui Choi, Suwon-si (KR)

(73) Assignee: TOSHIBA SAMSUNG STORAGE TECHNOLOGY KOREA CORPORATION, Suwon-si (KR)

( * ) Notice: Subject to any disclaimer, the term of this patent is extended or adjusted under 35 U.S.C. 154(b) by 0 days.

(21) Appl. No.: 13/183,735

(22) Filed: Jul. 15, 2011

(65) Prior Publication Data

US 2012/0122578 A1  May 17, 2012

(30) Foreign Application Priority Data

Nov. 12, 2010 (KR) .................. 10-2010-0113001

(51) Int. Cl.
  *A63F 13/245* (2014.01)
  *A63F 13/20* (2014.01)

(52) U.S. Cl.
  CPC ......... *A63F 13/245* (2014.09); *A63F 2300/105* (2013.01); *A63F 2300/1006* (2013.01); *A63F 2300/10* (2013.01); *A63F 13/06* (2013.01); *A63F 2300/1037* (2013.01); *A63F 2300/1043* (2013.01); *A63F 2300/1062* (2013.01)

(58) Field of Classification Search
  CPC .................. A63F 2300/1043; A63F 2300/10; A63F 2300/1006; A63F 13/23; A63F 13/24; A63F 13/26; A63F 13/98; A63F 13/211; A63F 13/20; G06F 3/00
  USPC ............................ 463/36; D21/333; D14/454
  See application file for complete search history.

(56) References Cited

U.S. PATENT DOCUMENTS

| | | | |
|---|---|---|---|
| 6,614,420 B1 * | 9/2003 | Han et al. ................. | 345/161 |
| 7,654,901 B2 * | 2/2010 | Breving .................... | 463/37 |
| 7,794,326 B2 * | 9/2010 | Wu et al. .................. | 463/37 |
| 7,839,383 B2 * | 11/2010 | Li et al. ................... | 345/156 |
| 8,047,936 B2 * | 11/2011 | DuFlon et al. ............ | 473/570 |
| 8,529,357 B2 * | 9/2013 | Joynes et al. ............. | 463/47 |
| 2004/0008191 A1 * | 1/2004 | Poupyrev et al. ......... | 345/184 |
| 2004/0235566 A1 * | 11/2004 | Hussaini et al. .......... | 463/37 |
| 2008/0004113 A1 * | 1/2008 | Avery et al. .............. | 463/37 |
| 2008/0014835 A1 * | 1/2008 | Weston et al. ............ | 446/484 |
| 2008/0146336 A1 * | 6/2008 | Feldman et al. .......... | 463/37 |
| 2008/0214306 A1 * | 9/2008 | Ludden ................... | 463/37 |

(Continued)

FOREIGN PATENT DOCUMENTS

| | | |
|---|---|---|
| JP | 08-103567 | 4/1996 |
| JP | 2000-308756 | 11/2000 |

(Continued)

OTHER PUBLICATIONS

Korean Office Action issued on May 3, 2013 in counterpart Korean Patent Application No. 10-2010-0113001. (4 pages in Korean).

*Primary Examiner* — Bach Hoang
*Assistant Examiner* — Anh Vo V Nguyen
(74) *Attorney, Agent, or Firm* — NSIP Law

(57) ABSTRACT

A game controller, a game machine, and a game system including the game system. The game controller is a device for manipulating a game program, and at least a portion of a body portion of the game controller is deformable to have forms that are adapted to contents of a game. Accordingly, a physical sensation when a user plays a game may be improved.

19 Claims, 8 Drawing Sheets

(56) References Cited

U.S. PATENT DOCUMENTS

| | | | |
|---|---|---|---|
| 2008/0220693 A1* | 9/2008 | Cuisinier | 446/473 |
| 2009/0005164 A1* | 1/2009 | Chang | 463/37 |
| 2009/0088248 A1* | 4/2009 | Stevens et al. | 463/36 |
| 2009/0093307 A1* | 4/2009 | Miyaki | 463/37 |
| 2009/0111580 A1* | 4/2009 | Nakajima | 463/37 |
| 2009/0248202 A1* | 10/2009 | Osuka et al. | 700/245 |
| 2010/0087252 A1* | 4/2010 | Tan et al. | 463/37 |
| 2011/0234483 A1* | 9/2011 | Lan et al. | 345/156 |
| 2012/0006124 A1* | 1/2012 | Mathias et al. | 73/788 |
| 2013/0012322 A1* | 1/2013 | Pena et al. | 463/38 |

FOREIGN PATENT DOCUMENTS

| | | |
|---|---|---|
| JP | 2007-083013 | 4/2007 |
| JP | 2007-275426 | 10/2007 |
| JP | 2008-307392 | 12/2008 |
| KR | 10-2007-0023573 | 2/2007 |

\* cited by examiner

GAME CONTROLLER, GAME MACHINE, AND GAME SYSTEM USING THE GAME CONTROLLER

CROSS-REFERENCE TO RELATED PATENT APPLICATION

This application claims the benefit of Korean Patent Application No. 10-2010-0113001, filed on Nov. 12, 2010, in the Korean Intellectual Property Office, the disclosure of which is incorporated herein in its entirety by reference.

BACKGROUND OF THE INVENTION

1. Field of the Invention

The present invention relates to game controllers, game machines, and game systems using the gate controllers, and more particularly, to game controllers capable of improving a physical sensation when playing a game, game machines, and game systems using the game controllers.

2. Description of the Related Art

A game controller is used to control characters displayed on a display device and usually includes manipulation buttons for playing a game.

Conventional game systems include game controllers that are optimized to particular games so as to improve a physical sensation when playing games. For example, for a car driving game, a game controller is in the form of a car steering wheel so as to improve the physical sensation of driving a car. For a shooting game, a game controller is in the form of a gun so as to improve the physical sensation of shooting.

SUMMARY OF THE INVENTION

One or more embodiments of the present invention provide game controllers, which are used commonly for various types of games and whereby a physical sensation when playing the games may be improved, game machines, and game systems using the gate controllers.

According to an aspect of the present invention, there is provided a game controller for manipulating a game program, comprising a first body portion that is deformable to have a plurality of forms which are different from each other.

The first body portion may comprise a fixable multi-joint structure.

The plurality of forms may comprise at least two forms selected from the group consisting of a straight line, a straight line having two portions that are bent in different directions, a circle, and a circle having a grip.

The game controller may further comprise an input unit formed in the first body unit. The first body portion may comprise a reaction force generating unit generating a reaction force according to contents of a game. The first body portion may comprise at least two coupling portions that can be coupled to each other.

The game controller may further comprise a second body portion that is connected to a first end of the first body portion. The game controller may further comprise at least two coupling portions that can be coupled to each other and are formed respectively at a second end of the first body portion and the second body portion.

An input unit including at least one manipulation button for manipulating a game may be formed in at least one of the first body portion and the second body portion. The input unit may include at least one manipulation button. Also, the input unit may further comprise a moving state detection unit that is formed in at least one of the first body portion and the second body portion and detects a moving state of the game controller. The moving state detection unit may detect directions of linear motion, planar motion or three-dimensional motion. The moving state detection unit may comprise at least one inertial sensor. The input unit may comprise only a moving state detection unit that is formed in at least one of the first body portion and the second body portion for detecting a moving state.

At least one of the first body portion and the second body portion may comprise a vibration unit generating vibration according to contents of a game.

At least one of the first body portion and the second body portion may comprise a transmission/reception unit transmitting/receiving data to/from a computer executing the game program. Alternatively, at least one of the first body portion and the second body portion may comprise an embedded computer for executing the game program. In this case, the game controller itself may be regarded as a game machine. In this case, the game controller may further comprise a transmission/reception unit a display device transmitting/receiving data to/from a display device that is additionally included for displaying a game image.

According to another aspect of the present invention, there is provided a game controller comprising: an input unit for manipulating a game; a transmission unit transmitting a game manipulation signal input by the input unit, to a computer for executing a game; and a frame in which the input unit and the transmission unit are mounted, wherein at least a portion of the frame deformable to have a plurality of forms which are different from each other.

At least a portion of the frame may comprise a fixable multi-joint structure.

The plurality of forms may comprise at least two forms selected from the group consisting of a straight line, a straight line having two portions that are bent in different directions, a circle, and a circle having a grip.

The input unit may comprise at least one manipulation button. The input unit may further comprise a moving state detection sensor detecting a moving state of at least one portion of a body portion. Alternatively, the input unit may comprise only a moving state detection sensor detecting a moving state of at least one portion of the body portion.

At least two portions of the frame may comprise at least two coupling portions that are able to be coupled to each other.

The game controller may further comprise a reception unit receiving a reaction force signal according to contents of a game from a computer that executes a game; and a reaction force generator generating reaction force according to the reaction force signal input to the reception unit.

According to another aspect of the present invention, there is provided a game machine comprising: a body portion; an input unit comprising at least one manipulation button for manipulating a game, wherein the at least one manipulation button is installed in at least one portion of the body portion; and a computer that is installed inside the body portion and executes a game program according to a game manipulation signal that is input by the input unit, wherein at least a portion of the body portion is deformable to have a plurality of forms which are different from each other.

The at least a portion of the body portion that is deformable to have a plurality of forms which are difference from each other may comprise a fixable multi-joint structure. The plurality of forms may comprise at least two forms selected from the group consisting of a straight line, a straight line having two portions that are bent in different directions, a circle, and a circle having a grip.

The input unit may comprise at least one manipulation button. The input unit may further comprise a moving state detection sensor detecting a moving state of at least one portion of a body portion. Alternatively, the input unit may comprise only a moving state detection sensor detecting a moving state of at least one portion of the body portion.

At least two portions of the frame may comprise at least two coupling portions that can be coupled to each other.

The game machine may further a reaction force generator generating reaction force according to contents of a game that is executed in a computer.

The game machine may further comprise a display device displaying a character of the game executed in the computer. Thus, by including the above-described components, the display device inclusive, the game machine may be used as a mobile device. In this case, the body portion may be deformed to a shape that minimizes the size of the game machine, thereby enabling the user to carry the game machine easily.

According to another aspect of the present invention, there is provided a game system comprising: a game controller manipulating a game program; a computer that is connected to the game controller in a wired or wireless manner to execute a game program according to a manipulation signal transmitted by the game controller; and a display device outputting an image output by the computer, wherein the game controller comprises a first body portion that is deformable to have a plurality of forms which are different from each other. The manipulation signal may be transmitted/received between the game controller and the computer in a wired or wireless manner.

According to another aspect of the present invention, there is provided a game system comprising: a game controller manipulating a game program; a computer that is connected to the game controller in a wired or wireless manner to execute a game program according to a manipulation signal transmitted by the game controller; and a display device outputting an image output by the computer, wherein the game controller comprises an input unit for manipulating a game; a transmission unit transmitting a game manipulation signal input by the input unit, to a computer for executing a game; and a frame in which the input unit and the transmission unit are mounted, wherein at least a portion of the frame is deformable to have a plurality of forms which are different from each other. The manipulation signal may be transmitted/received between the game controller and the computer in a wired or wireless manner.

According to another aspect of the present invention, there is provided a game system comprising: a game machine; and a display device that is connected to the game machine in a wired or wireless manner to output an image output by the game machine, wherein the game machine comprises a body portion; an input unit that is installed in at least one portion of the body portion for manipulating a game; and a computer that is installed inside the body portion and executes a game program according to a game manipulation signal that is input by the input unit, wherein at least a portion of the body portion is deformable to have a plurality of forms which are different from each other.

According to the embodiments of the present invention, the game controllers, the game machines, and the game systems using the gate controllers are used commonly for various types of games and are deformed to have suitable forms according to the games, thereby improving a physical sensation when playing the games.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
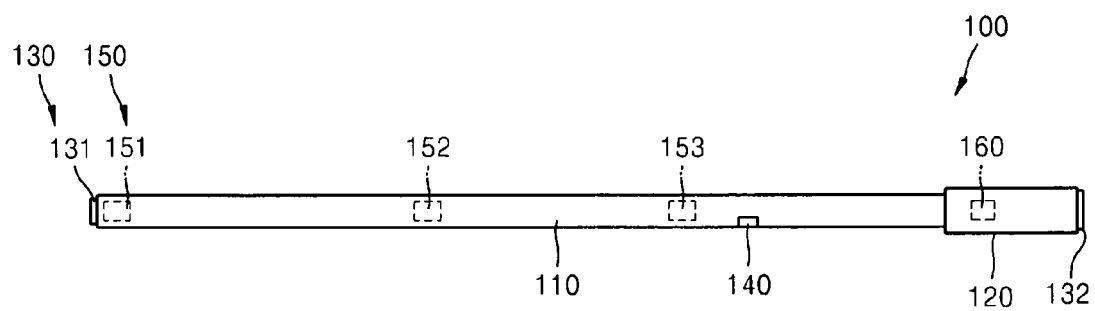
FIG. 1 illustrates a game controller according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. Like reference numerals in the drawings denote like elements, and thus sizes of elements may be exaggerated in the drawings for clarity and convenience of description.

FIG. 1 illustrates a game controller 100 according to an embodiment of the present invention.

Referring to FIG. 1, the game controller 100 includes a first body portion 110 and a second body portion 120. The first body portion 110 and the second body portion 120 may be regarded as frames or a housing of the game controller 100.

The first body portion 110 has a flexible structure that is deformable to have a plurality of various forms. That is, the first body portion 100 may be deformed to have various forms such as a straight line, a straight line having two portions that are bent in different directions, or a circle having a grip, may also be returned to its original form, and may be maintained in the deformed form.

The second body portion 120 may have a bar shape and may include a wireless or wired input/output module through which a signal may be transmitted to or received from a computer in which a game program is executed, that is, a main body of a game machine. Alternatively, a computer in which game programs are executed may be included in the second body portion 120, or the game controller 100 may itself be a game machine in which game programs are executed independently. According to circumstances, the second body portion 120 may be omitted. When the second body portion 120 is omitted, a computer for executing game programs and a wireless or wired input/output module for transmitting/receiving a signal may be installed in the first body portion 110 or a computer for executing game programs may be installed in the first body portion 110.

Figure 2:
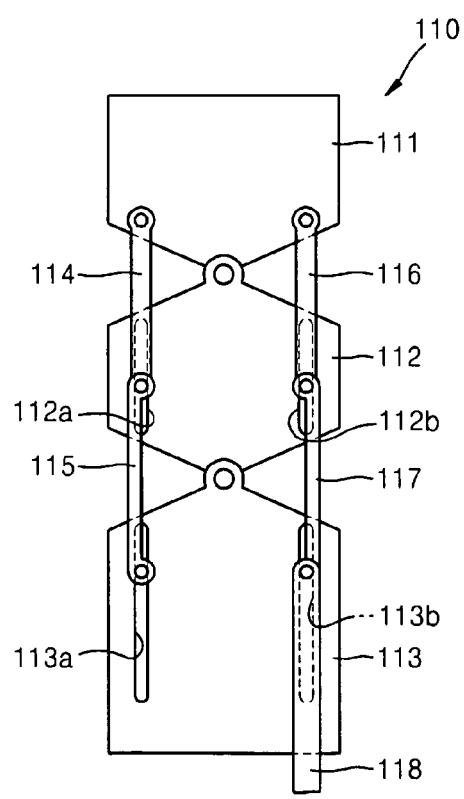
FIG. 2 illustrates a flexible structure of a first body portion of the gate controller of FIG. 1, according to an embodiment of the present invention.

An example of the flexible structure of the first body portion 110 is illustrated in FIG. 2. Referring to FIG. 2, a plurality of frames, first through third frames 111, 112, and 113 that are serially arranged constitute a multi-joint structure in which they are rotatably coupled to one another. First and second fixing links 114 and 115 and first through third moving links 116, 117, and 118 are formed along two lines of a central line that passes through rotational axes R1 and R2 of the frames 111, 112, and 113. A first end of the first fixing link 114 and a first end of the second moving link 116 are rotatably fixed to the first frame 111 at a front end. Also, in the second frame 112, long grooves 112a and 112b that are extended in a lengthwise direction of the second frame 112 are formed on two sides of the central line passing through the rotational axes R1 and R2. Also, long grooves 113a and 113b that are extended in a lengthwise direction of the third frame 113 are formed on two sides of the central line passing through the rotational axes R1 and R2 in the third frame 113. A pin 119a that rotatably couples a second end of the first fixing link 114 and a first end of the second fixing link 115 is inserted into the long groove 112a so as to move linearly in a lengthwise direction of the long groove 112a. Also, a pin 119b that rotatably couples a second end of the second fixing link 115 to the third frame 113 is inserted into the long groove 113a so as to move linearly in a lengthwise direction of the long groove 113a. Also, a pin 119c that rotatably couples a second end of the first moving link 116 to a first end of the second moving link 117 is inserted into the long groove 112b so as to move linearly in a lengthwise direction of the long groove 112b. Also, a pin 119d that rotatably couples a second end of the second fixing link 115 to a first end of the third moving link 118 is inserted into the long groove 113b so as to move linearly in a lengthwise direction of the long groove 113b. The third moving link 118 may be selectively fixed using a separate fixing unit (e.g., a screw, a pin, etc.).

When moving the third moving link 118 in the first body portion 110 having the above-described structure, a portion of each of the first through third frames 111 through 113 receives a force around the rotational axes R1 and R2, and the first through third frames 111 through 113 will bend. On the other hand, when the third moving link 118 is fixed, the bent shape of the first through third frames 111 through 113 may be fixed. While FIG. 2 illustrates a multi-joint structure formed of three frames (the first through third frames 111 through 113), alternatively, a plurality of second frames 112 may be serially connected. The first body portion 110 having a multi-joint structure as described above may be deformed to have a shape according to the contents of a game as will be described later, and thus body sensation may be significantly improved when playing games.

The flexible structure of the first body portion 110 of FIG. 2 is an example and the present invention is not limited thereto. For example, a multi-joint device, in which a fixing element is formed at each joint, or other well-known, fixable structures may be used as the flexible structure of the first body portion 110. For example, when the first body portion 110 has a multi-joint structure in which a fixing element is formed at each joint and each joint may be independently rotated, the first body portion 110 may have more various shapes.

Figure 3:
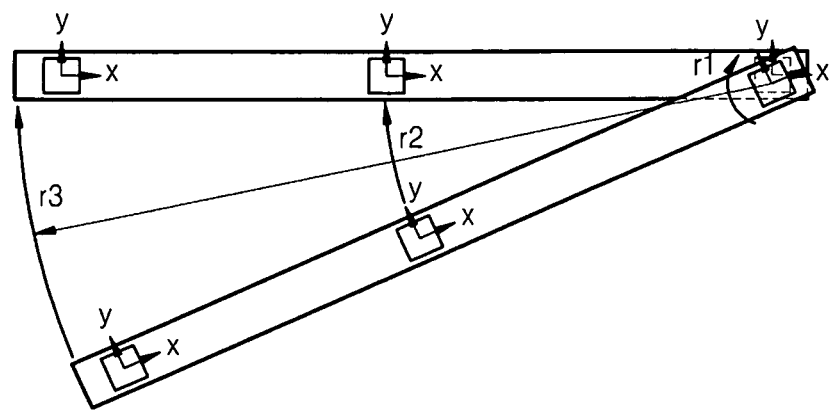
FIG. 3 illustrates an example of a deformable shape of a first body portion of the game controller of FIG. 1.
Figure 4:
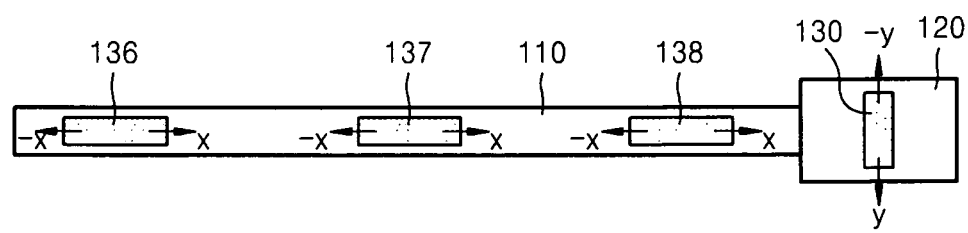
FIG. 4 illustrates another example of a deformable shape of the first body portion of the game controller of FIG. 1.

FIGS. 3 and 4 illustrate examples of deformable shapes of the first body portion 110. The first body portion 110 may have not only a straight linear shape as illustrated in FIG. 1 but also a circle shape like a steering wheel as illustrated in FIG. 3 or a straight line shape having two portions that are bent in different directions as illustrated in FIG. 4.

For example, if a game to be played requires a straight-line instrument, such as fencing or golf, the game controller 100 may have a straight linear shape as illustrated in FIG. 1 to manipulate the game. Alternatively, if a game to be played requires a circular steering wheel, such as driving a car or flying an airplane, the game controller 100 may have a circular shape like a steering wheel as illustrated in FIG. 3 to manipulate the game. Alternatively, if a game to be played requires using a gun, like that used in a shooting game, the game controller 100 may have a straight linear shape having two portions that are bent in different directions as illustrated in FIG. 4 to manipulate the game.

Alternatively, the first body portion 110 may have other various shapes according to the characteristics of particular games in order to manipulate the games.

A coupling portion 130 may be formed in the first body portion 110 having a flexible structure and the second body portion 120. For example, the coupling portion 130 may include a first coupling unit 131 and a second coupling unit 132 respectively formed at a first end of the first body portion 110 and a second end of the second body portion 120. The first coupling unit 131 and the second coupling unit 132 are coupled to each other as illustrated in FIG. 3 so that the game controller 100 may maintain the circular shape like that of a steering wheel.

An input unit may include a manipulation button 140. For example, the manipulation button 140 may be formed in the first body portion 110, and when the first body portion 110 has a shape like a gun as illustrated in FIG. 4, the manipulation button 140 may function as a trigger. The manipulation button 140 may be formed in the first body portion 110 as illustrated in FIG. 2, but is not limited thereto. According to the characteristics of games to be played, the manipulation button 140 may be formed in the second body portion 120, or a plurality of manipulation buttons 140 may be formed in the first body portion 110 and/or the second body portion 120.

A moving state detection unit 150 may be further formed in the first body portion 110. The moving state detection unit 150 includes a plurality of detection sensors 151, 152, and 153 that are arranged at predetermined intervals in a lengthwise direction of the first body portion 110. The detection sensors 151, 152, and 153 individually or collectively detect directions of linear motion, planar motion or three-dimensional motion. For example, the detection sensors 151, 152, and 153 may be a 1-axis inertial sensor, a 2-axis inertial sensor, or a 3-axis inertial sensor.

Figure 5:
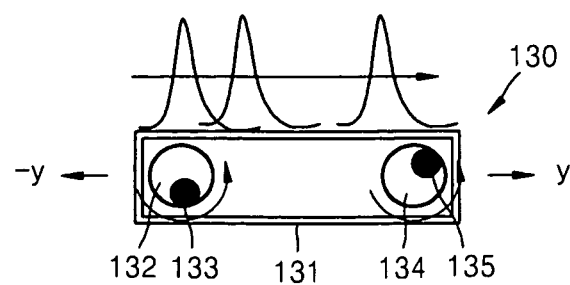
FIG. 5 illustrates a moving state detection unit installed in the first body portion of the gate controller of FIG. 1, according to an embodiment of the present invention.

By detecting motion of the first body portion 110, the moving state detection unit 150 may be an input unit that recognizes an operation of a user for manipulating game programs being executed. For example, when a straight-line instrument is used like in a game of fencing or golf, the game controller 100 may have a straight-line shape as illustrated in FIG. 5 and may rotate. In this case, the detection sensors 151, 152, and 153 may have different accelerations at various locations of r1, r2, and r3 from a rotational center to thereby detect rotational amounts. In addition, when the first body portion 110 has a circular shape of a steering wheel as illustrated in FIG. 3, a rotational amount is detected using the detection sensors 151, 152, and 153 at different positions of the first body portion 110, thereby detecting motion of the steering wheel.

According to circumstances, the moving state detection unit 150 may be omitted, or an input unit may be formed of only the moving state detection unit 150 without the manipulation button 140.

A reaction force generating unit 160 may be formed in the second body portion 120.

Figure 6:
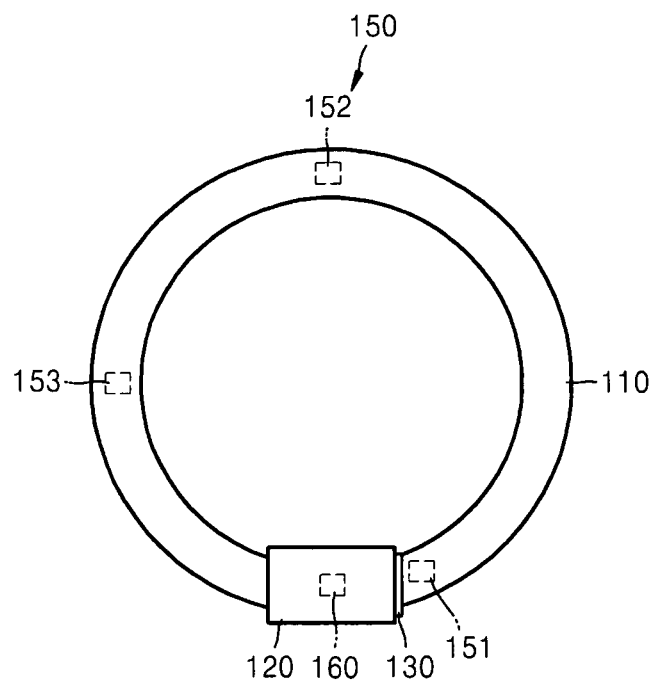
FIG. 6 illustrates a reaction force generating unit installed in the game controller of FIG. 1, according to an embodiment of the present invention.

FIG. 6 illustrates the reaction force generating unit 160 according to an embodiment of the present invention. Referring to FIG. 6, the reaction force generating unit 160 may include two vibration motors 162 and 164 that are spaced apart in a body portion 131. The vibration motors 162 and 164 respectively include weights 163 and 165 at positions away from a rotational axis, and when the vibration motors 162 and 164 rotate, vibration is generated according to rotation of the weights 163 and 165. When the weights 163 and 165 are sequentially directed in a y-direction, it has the same effect as a reaction force generated in the y-direction. The reaction force generating unit 160 allows the user to experience a touch sensation according to the contents of a game, thereby improving the physical sensation of the game. For example, in a shooting game that uses a gun, a reaction force is generated in the reaction force generating unit 160 every time the manipulation button 140 is pressed to improve the sensation of shooting.

In the current embodiment, the reaction force generating unit 160 is formed in the second body portion 120 but the embodiment is not limited thereto. For example, another reaction force generating units 166, 167, and 168 may be spaced apart at predetermined intervals in the first body portion 110. A direction of reaction force of the reaction force generating units 166, 167, and 168 may be set to be a lengthwise direction of the first body portion 110, that is, an x-direction, so that a sensation due to the reaction force being transferred along a lengthwise direction of the first body portion 110 may be realized.

As described above, the reaction force generating unit 160 is installed in order to improve the physical sensation of the game but also, instead of the reaction force generating unit 160, a simple vibration unit may be installed to generate vibration according to game contents.

Figure 8:
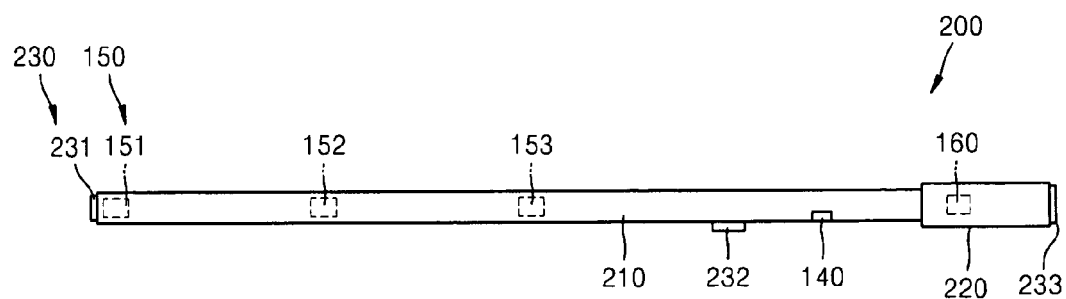
FIG. 8 illustrates a game controller according to another embodiment of the present invention.
Figure 9:
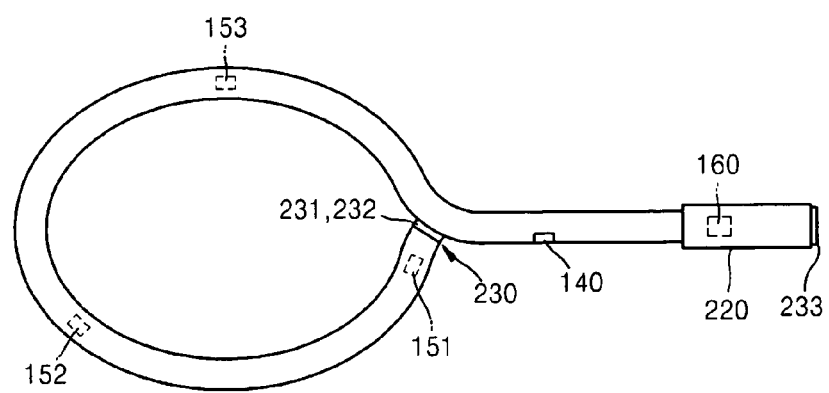
FIG. 9 illustrates an example of a deformable shape of a first body portion of the game controller of FIG. 8.

FIG. 8 illustrates a game controller 200 according to another embodiment of the present invention. FIG. 9 illustrates an example of a deformable shape of a first body portion 210 of the game controller 200 of FIG. 8.

Figure 7:
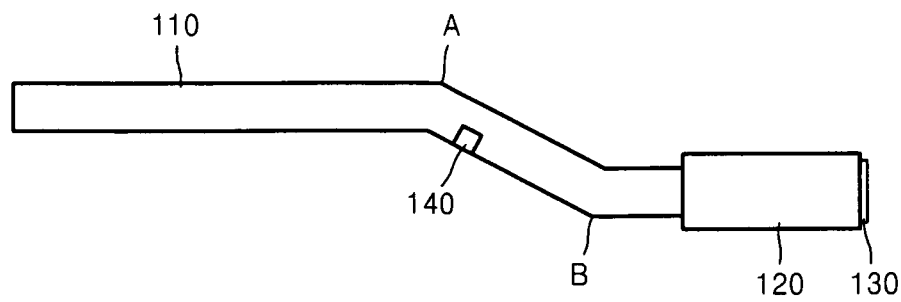
FIG. 7 illustrates a reaction force generating unit installed in the game controller of FIG. 1, according to another embodiment of the present invention.

Referring to FIGS. 8 and 9, a coupling unit 230 includes first and second coupling units 231 and 232 formed in the first body portion 210. A third coupling unit 233 may be further formed in the second body portion 220. The game controller 200 is the same as the game controller 100 of FIG. 7 except for the position of the coupling unit 230, and thus a description thereof will not be repeated here.

As the first and second coupling units 231 and 232 that can be coupled to each other are formed in the first body portion 210 itself, the game controller 200 may be deformed to have a racket shape as illustrated in FIG. 9 as the first and second coupling units 231 and 232 of the first body portion 210 are coupled to each other. In this case, the first and second coupling units 231 and 232 may sense motion of the game controller 200 created when it is swung like a racket, and the second body portion 220 may function as a grip of the racket.

Meanwhile, the reaction force generating unit 160 formed in the second body portion 220 may realize a sensation of hitting a ball with a racket.

Figure 10:
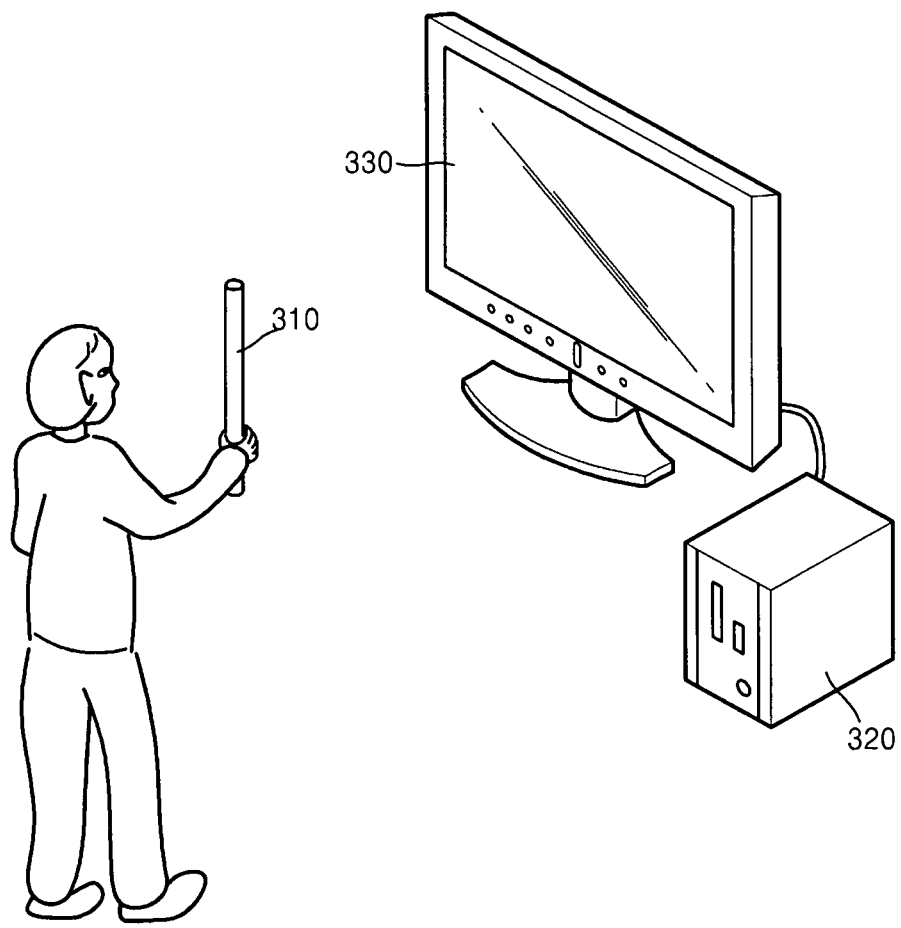
FIG. 10 illustrates a game system according to an embodiment of the present invention.
Figure 11:
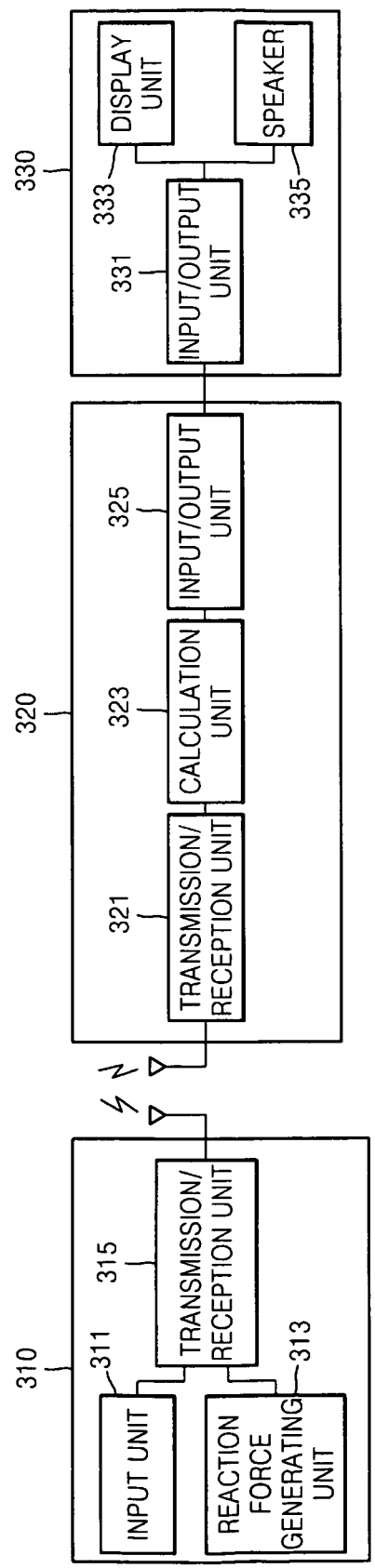
FIG. 11 is a block diagram illustrating the game system of FIG. 10.

FIG. 10 illustrates a game system according to an embodiment of the present invention. FIG. 11 is a block diagram illustrating the game system of FIG. 10.

Referring to FIGS. 10 and 11, the game system includes a game controller 310, a game machine 320, and a display device 330.

The game controller 310 may be the game controller 100 or 200 described with reference to FIGS. 1 through 9. The game controller 310 includes an input unit 311 like the manipulation button 140 of FIG. 1 or the moving state detection unit 150 and a transmission/reception unit 315 that transmits or receives data to/from the game machine 320. Furthermore, as described above, the game controller 310 may include the reaction force generating unit 160 that improves a touch sensation for a user.

The game machine 320 may include a transmission/reception unit 321 transmitting/receiving data to/from the game controller 310, a calculation unit executing game programs (i.e., a computer), and an input/output unit 325 outputting game contents as an image or a sound signal. The game machine 320 may be an exclusive game device or an all-purpose computer. When the game controller 310 includes the reaction force generating unit 160 that improves the touch sensation for the user as described above, the game machine 320 may transmit an appropriate reaction force signal to the game controller 310 according to the contents of the games.

The display device 330 may include an input/output unit receiving an image signal and a sound signal transmitted by the game machine 320, a display unit 333 displaying an image according to the image signal, and a speaker 335 outputting a sound according to the sound signal. Alternatively, the speaker 335 may be included separately.

Wireless transmission/reception between the game controller 310 and the game machine 320 is illustrated in FIG. 11, but the game controller 310 and the game machine 320 may also be connected to each other via a wire. Also, the game machine 320 and the display device 330 may be connected in a wired or wireless manner. The game machine 320 and the display device 330 are separately formed in FIG. 11 but may also be formed as a single unit according to circumstances.

Figure 12:
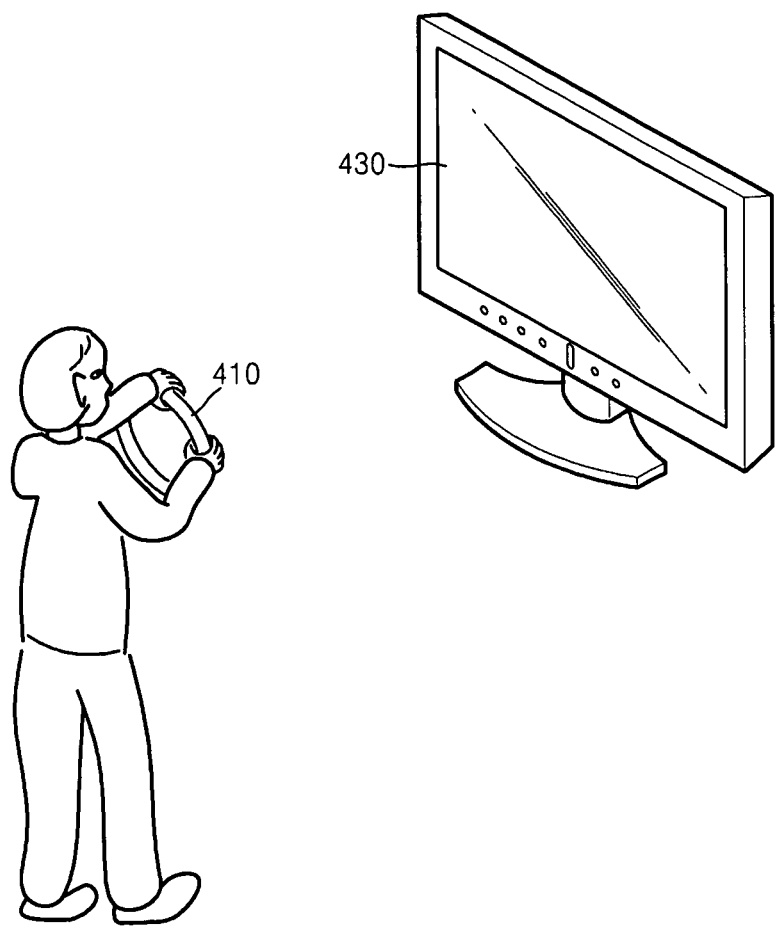
FIG. 12 illustrates a game system according to another embodiment of the present invention.
Figure 13:
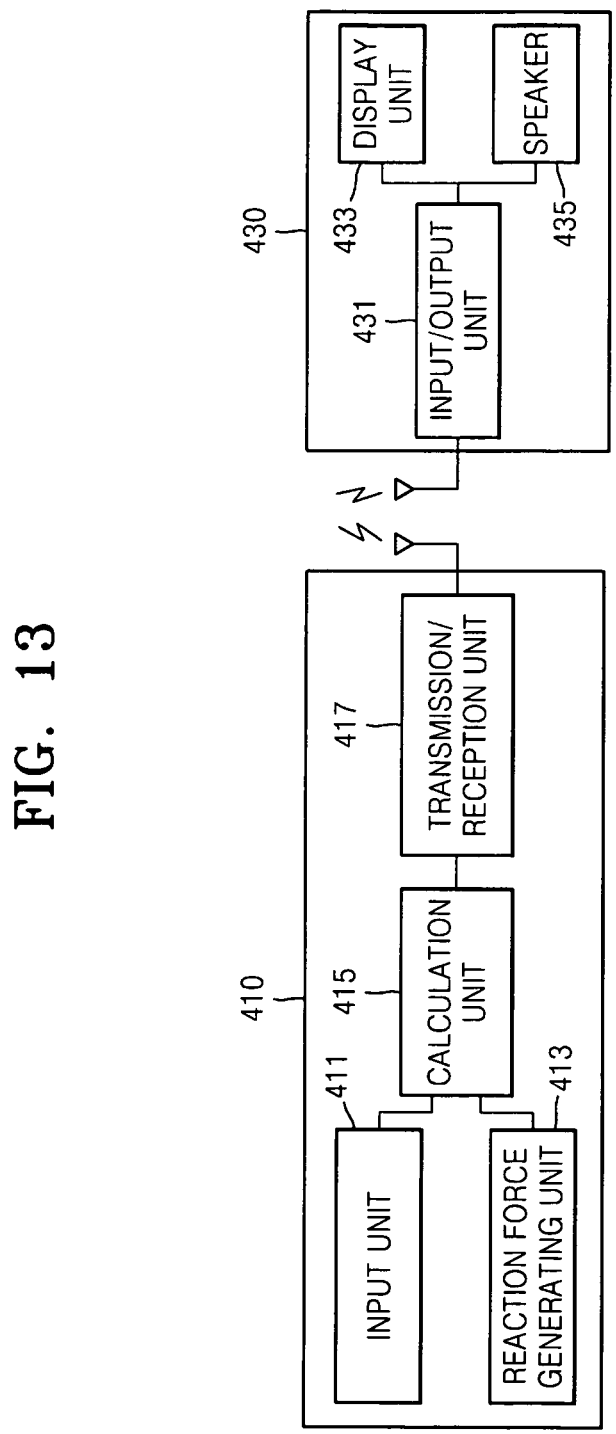
FIG. 13 is a block diagram illustrating the game system of FIG. 12.

FIG. 12 illustrates a game system according to another embodiment of the present invention. FIG. 13 is a block diagram illustrating the game system of FIG. 12.

Referring to FIGS. 12 and 13, the game system includes a game machine 410 and a display device 430. The game machine 410 includes an input unit 411, a reaction force generating unit 413, a calculation unit 415 (i.e., a computer), and a transmission/reception unit 417. The game machine 410 according to the current embodiment may be regarded as a device that is formed of the game controller 310 and the game machine 320 formed as a single unit described with reference to FIGS. 10 and 11. The game machine 410 may have substantially the same configuration as that of the game controller 100 or 200 of the embodiments described with reference to FIGS. 1 through 9. In addition, the calculation unit 415 executing game programs is mounted in a body portion of the game machine 410.

The display device 430 includes an input/output unit 431 receiving an image signal and a sound signal transmitted by the game machine 410, a display unit 433 displaying an image according to the image signal, and a speaker 435 outputting a sound according to the sound signal. Alternatively, the speaker 435 may be included separately. Wireless transmission/reception between the game machine 410 and the display device 430 is illustrated in FIG. 13, but the game machine 410 and the display device 430 may also be connected via a wire according to circumstances.

According to the current embodiment, the game machine 410 and the display device 430 are separated but the embodiment is not limited thereto. The display device 430 may be mounted in the game machine 410 such that the game machine 410 may be used as a mobile device. In this case, the display device 430 may be installed in the second body portion 120 or 220 of the above-described embodiments which is not deformable, but the embodiment is not limited thereto. For example, if the display device 430 is a flexible display device, the display device 430 may be installed in a deformable body portion like the second body portion 120 or 220 of the above-described embodiments.

In the above-described embodiments of the present invention, the game controllers 100, 200, and 310 or the game machine 410 may be deformed so as to reduce the size of the first body portion 110 of FIG. 1 or the first body portion 210 of FIG. 8 by as much as possible, thereby improving convenience in regard to storage or portability.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A game controller to manipulate a game program, comprising:
   a first body portion that is bendable, deformable, and configured to have a plurality of forms different from each other, the first body portion comprising a first end and a second end;
   a second body portion connected to the second end of the first body portion;
   a first coupling portion formed at the first end of the first body portion;
   a second coupling portion formed on the first body portion;
   a third coupling portion formed on the second body portion; and
   at least one of a sensor and an input unit formed in a bendable portion of the first body portion,
   wherein the first coupling portion is configured to be coupled to the second coupling portion in response to the first body portion being bent in a first configuration;
   wherein the first coupling portion is configured to be coupled to the third coupling portion in response to the first body portion being bent in the second configuration; and
   wherein the input unit further comprises a moving state detection sensor formed in at least one of the first body portion and the second body portion to detect a moving state of the game controller.

2. The game controller of claim 1, wherein the first body portion comprises a multi-joint structure.

3. The game controller of claim 2, wherein the multi-joint structure is fixable.

4. The game controller of claim 1, wherein the plurality of forms comprise at least two forms selected from the group consisting of a straight line, a shape having two linear portions bent in different directions, a circle, and a circle having a grip.

5. The game controller of claim 1, wherein the first body portion comprises a reaction force generating unit to generate a reaction force according to contents of a game.

6. The game controller of claim 1, wherein an input unit including at least one manipulation button to manipulate a game is formed in at least one of the first body portion and the second body portion.

7. The game controller of claim 1, wherein at least one of the first body portion and the second body portion comprises a vibration unit to generate vibration according to contents of a game.

8. The game controller of claim 1, wherein at least one of the first body portion and the second body portion comprises a transmission/reception unit to transmit/receive data to/from a computer executing the game program.

9. The game controller of claim 1, wherein at least one of the first body portion and the second body portion comprises an embedded computer configured to execute the game program.

10. The game controller of claim 1, wherein the second body portion is not capable of being deformed.

11. A game machine comprising:
   a first body portion that is bendable and deformable to have a plurality of forms different from each other, the first body portion comprising a first end and a second end;
   an input unit comprising at least one manipulation button to manipulate a game, wherein the at least one manipulation button is installed in a bendable portion of the first body portion;
   a second body portion connected to the second end of the first body portion;
   a first coupling portion formed at the first end of the first body portion;
   a second coupling portion formed on the first body portion;
   a third coupling portion formed on the second body portion; and
   a computer installed inside the first body portion or the second body portion, and configured to execute a game program according to a game manipulation signal input by the input unit,
   wherein the first coupling portion is configured to be coupled to the second coupling portion in response to the first body portion being bent in a first configuration;
   wherein the first coupling portion is configured to be coupled to the third coupling portion in response to the first body portion being bent in the second configuration; and
   wherein the input unit further comprises a moving state detection sensor formed in at least one of the first body portion and the second body portion to detect a moving state of the game controller.

12. The game machine of claim 11, wherein the first body portion comprises a multi-joint structure.

13. The game machine of claim 12, wherein the plurality of forms comprise at least two forms selected from the group consisting of a straight line, a shape having two linear portions bent in different directions, a circle, and a circle having a grip.

14. The game machine of claim 12, wherein the multi-joint structure is fixable.

15. The game machine of claim 12, further comprising a display device to display characteristics of the game program executed in the computer.

16. The game machine of claim 12, wherein the game machine is a mobile device.

17. A game system comprising:

a game controller configured to manipulate a game program, the game controller comprising:

a first body portion that is bendable, deformable, and configured to have a plurality of forms different from each other, the first body portion comprising a first end and a second end;

a second body portion connected to the second end of the first body portion;

a first coupling portion formed at the first end of the first body portion;

a second coupling portion formed on the first body portion;

a third coupling portion formed on the second body portion;

a moving state detection sensor formed in at least one of the first body portion and the second body portion to detect a moving state of the game controller;

a computer configured to execute the game program according to a manipulation signal transmitted by the game controller; and a display device connected to the computer in a wired or wireless manner to output an image output by the computer, wherein the first coupling portion is configured to be coupled to the second coupling portion in response to the first body portion being bent in a first configuration, and wherein the first coupling portion is configured to be coupled to the third coupling portion in response to the first body portion being bent in the second configuration.

18. A game controller for manipulating a game program, comprising:

a first body portion configured to bend and deform according to contents of a game, the first body portion comprising a multi-joint structure having a first end and a second end;

a second body portion connected to the second end of the first body portion;

a first coupling portion formed at the first end of the first body portion;

a second coupling portion formed on the first body portion;

a third coupling portion formed on the second body portion; and at least one of a sensor and an input unit formed in a bendable portion of the body portion, wherein the first coupling portion is configured to be coupled to the second coupling portion in response to the first body portion being bent to configure the game controller in a racquet shape, and wherein the first coupling portion is configured to be coupled to the third coupling portion in response to the first body portion being bent to configure the game controller in a circular shape; and wherein the input unit further comprises a moving state detection sensor formed in at least one of the first body portion and the second body portion to detect a moving state of the game controller.

19. The game controller of claim 18, further comprising:

a second body portion that is not capable of being deformed, wherein bending and deformation of the first body portion allow the body portion to bend into a form comprising a straight line and a shape having two linear portions bent in different directions.

\* \* \* \* \*